United States Patent Office 3,276,527
Patented Oct. 4, 1966

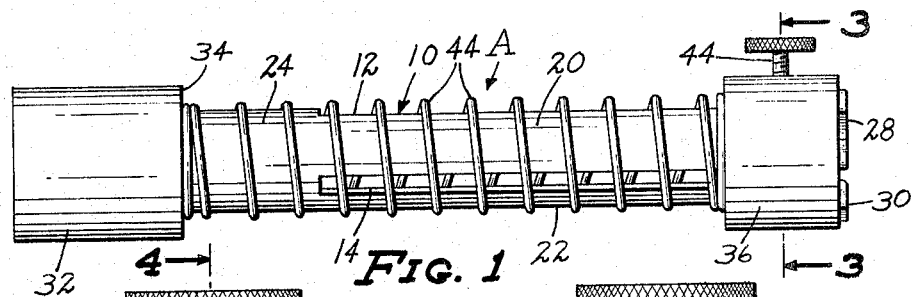
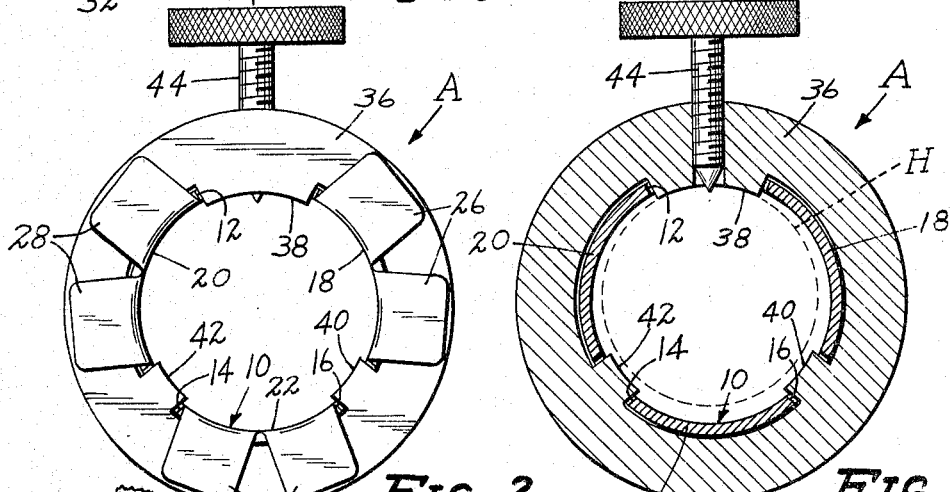
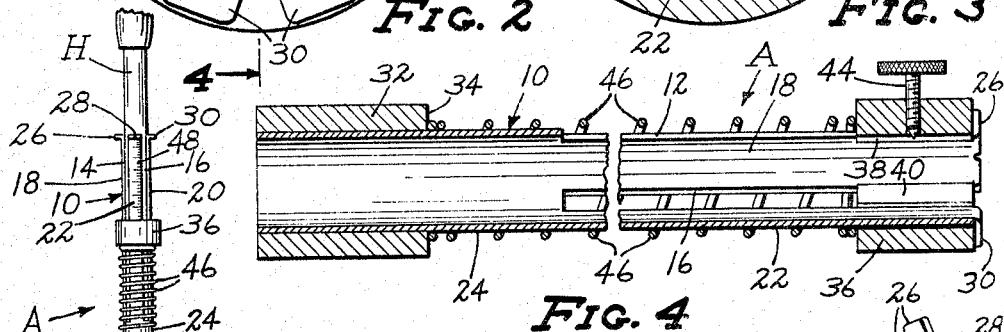
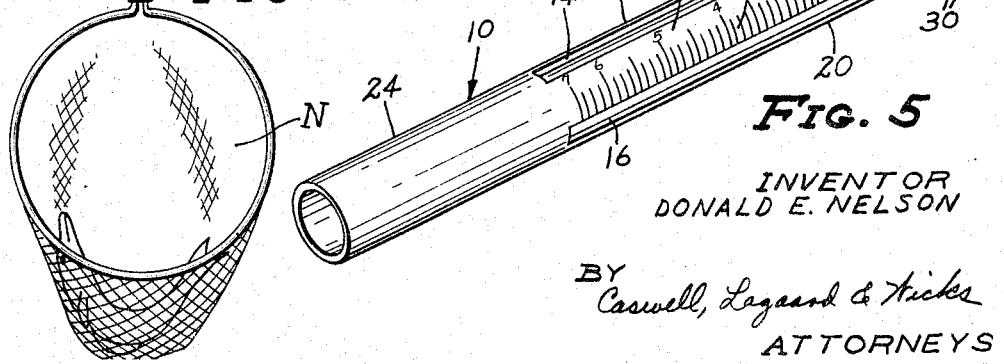

3,276,527
SCALE FOR MOUNTING ON A FISH NET HANDLE
Donald E. Nelson, 1516 Broadway, Superior, Wis.
Filed Aug. 20, 1965, Ser. No. 481,187
4 Claims. (Cl. 177—149)

The invention relates broadly to an improvement in scales and more specifically to a scale unit which is mountable on and permanently operable with the conventional handle of a fish net.

There are several known fish nets having handles with scales as an integral formation therewith.

It is an object of the invention to provide a scale which is easily and simply mounted on the elongated handle of a fish net and used in connection therewith for weighing a fish in the net on the handle.

It is a further object to provide a scale constructed as a unit to be applied to a conventional fish net handle. It is an additional object to provide a scale which can be easily and quickly applied to fish net handles of different diameters.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is side elevational view of the scale.

FIGURE 2 is an enlarged top end view of the scale.

FIGURE 3 is a section on the line 3—3 of FIGURE 2 with a cross-section of a net handle shown in broken lines.

FIGURE 4 is a longitudinal section of the scale taken on the line 4—4 of FIGURE 2, a portion of the scale being broken away.

FIGURE 5 is a perspective view of the sleeve member removed from the scale.

FIGURE 6 is an elevational view of the scale mounted on the handle of a fish net in operable condition.

Referring to the drawings in detail, the scale A includes the support sleeve 10 which has formed in the wall thereof the circumferentially spaced slots 12, 14 and 16 which form the longitudinally extending fingers 18, 20, and 22. The slots 12, 14 and 16 at the inner ends thereof terminate short of the inner end of the sleeve to form a continuous sleeve portion 24. The outer free ends of the fingers 18, 20 and 22 are formed with the bifurcated right-angular stop flanges 26, 28 and 30, respectively.

Further provided is the lower collar 32 the inside diameter of which is the same as the outside diameter of the sleeve 10 and which is secured upon the inner end of the sleeve 10 on the portion 24 thereof. The inner edge 34 of the lower collar 32 acts as a stop shoulder. The numeral 36 designates an anchor collar the inside diameter of which is slightly greater than the outside diameter of the sleeve whereby the anchor collar is slidable axially on the sleeve 10 in the area of the fingers 18, 20 and 22.

The anchor collar 36 has formed on the inner surface thereof the longitudinally extending ribs 38, 40 and 42. The rib 38 is of a greater width than the other ribs to provide a greater and adequate bearing surface for the handle H of the fish net F on which the scale is mounted. The width of the ribs 38, 40 and 42 is slightly less than the width of the slots 12, 14 and 16 in which the same are positioned so that there can be sliding relative movement between the ribs of collar 36 and the fingers 18, 20 and 22. The inner surface of the ribs 38, 40 and 42 are arcuately formed parallel to the wall of sleeve 10. Further provided is the anchoring screw 44 mounted on the anchor collar 36. The screw 44 extends radially through the rib 38 and normal to the longitudinal axis of the collar and tube 10. The anchor collar is positioned on the fingers 18, 20 and 22 of the sleeve 10 prior to securing the lower collar 32 on the sleeve.

Positioned on the sleeve 10 between the shoulder portion 34 of the lower collar 32 and the anchor collar 36 is the coil spring 46 which normally urges the flanges 26, 28 and 30 against collar 36 for a zero scale reading. Scale registering indicia 48 is formed on the finger 20. The inside diameter of the rib formations 38, 40 and 42 is such that it will freely receive several sizes of handles such as H.

To use and mount the scale A on the handle H of the net F, the handle H is extended through the sleeve 10 to the position illustrated in FIGURE 6. The screw 44 is then rotated to threadedly engage the handle H which draws up the handle H securely against the rib 38 as illustrated particularly and anchors the handle on the rib thereby securing the collar 36 to the handle H.

With the scale A securely mounted on the handle H the same is used by holding the handle in a vertical position as in FIGURE 6 and grasping the lower collar 32 which allows the anchor collar 36 to be moved and pulled downwardly upon the fingers 18, 20 and 22 against the spring 46 due to the weight in the net N attached to the lower end of the handle H thus exposing the scale registering indicia 48. The scale is read by consulting the position of the upper edge of the collar 36 upon the indicia 48.

The invention is not to be understood as restricted to the details set forth since these may be modified within the scope of the appended claims without departing from the spirit and scope of the invention.

Having thus described the invention what is claimed as new and desired to be secured by Letters Patent is:

1. A scale for mounting on and cooperation with the elongated handle of a fish net comprising:
   (a) a sleeve,
   (b) said sleeve having a plurality of longitudinally extending spaced slots formed therein,
   (c) said slots forming spaced finger members therebetween,
   (d) each of said finger members having flange means on the outer end thereof,
   (e) a lower collar secured on the inner end of said sleeve,
   (f) an anchor collar,
   (g) means for securing the anchor collar to the handle of a fish net, and
   (h) a coil spring positioned on said sleeve between said lower collar and said anchor collar normally urging said flanges of said sleeve and said anchor collar together, said anchor collar slidably separated from said flanges on said fingers against the urging of said spring by an axial force exerted on a handle secured to said anchor collar with said lower collar held stationary.

2. A scale for mounting on and cooperation with the elongated handle of a fish net comprising:
   (a) a sleeve,
   (b) said sleeve having longitudinally extending slots formed therein,
   (c) said slots forming spaced finger members,
   (d) each of said finger members having stop means on the outer end thereof, (e) a lower collar secured on the inner end of said sleeve,
(f) an anchor collar,
(g) means for securing the anchor collar to the handle of a fish net,
(h) a coil spring positioned on said sleeve between said lower collar and said anchor collar normally urging said stop means and said anchor collar together, said anchor collar slidably separated from said stop means on said fingers against the urging of said spring by an axial force exerted on a handle secured to said anchor collar with said lower collar held stationary.

3. A scale for mounting on and cooperation with the elongated handle of a fish net comprising:
(a) a sleeve,
(b) said sleeve having longitudinally extending slots formed therein,
(c) said slots forming spaced finger members,
(d) each of said finger members having stop means on the outer end thereof,
(e) shoulder means secured on the inner end of said sleeve,
(f) an annular anchor member,
(g) means for securing said anchor member to the handle of a fish net,
(h) spring means on said sleeve interposed between said shoulder means and said anchor member normally urging said stop means and said anchor member together, said anchor member slidably separated from said stop means on said fingers against the urging of said spring means by an axial force exerted on a handle secured to said anchor member with said shoulder means held stationary.

4. A scale for mounting on and cooperation with the elongated handle of a fish net comprising:
(a) a sleeve,
(b) said sleeve having a plurality of longitudinally extending spaced slots formed therein,
(c) said slots forming spaced finger members therebetween,
(d) each of said finger members having flange means on the outer end thereof,
(e) a lower collar secured on the inner end of said sleeve,
(f) an anchor collar,
(g) said anchor collar having spaced ribs extending longitudinally on the inner surface thereof adapted to extend inwardly radially between said fingers of said sleeve,
(h) means for securing the handle of a fish net to one of said ribs within said anchor collar, and
(i) a coil spring positioned on said sleeve between said lower collar and said anchor collar normally urging said flanges and said anchor collar together, said anchor collar slidably separated from said flanges on said fingers against the urging of said spring by an axial force exerted on a handle secured to said anchor collar with said lower collar held stationary.

References Cited by the Examiner
UNITED STATES PATENTS
3,223,189   12/1965   Robbins _____ 177—149

RICHARD B. WILKINSON, *Primary Examiner.*

G. H. MILLER, Jr., *Assistant Examiner.*